US012586955B2

(12) United States Patent
Su et al.

(10) Patent No.: US 12,586,955 B2
(45) Date of Patent: Mar. 24, 2026

(54) PROTECTIVE COMPONENT OF CONNECTOR SOCKET AND PROTECTIVE PLUG CAP THEREOF

(71) Applicant: HSING CHAU INDUSTRIAL CO., LTD., Taipei City (TW)

(72) Inventors: Wei-Hao Su, Taipei City (TW); Chi-Pei Lee, Taipei City (TW)

(73) Assignee: HSING CHAU INDUSTRIAL CO., LTD., Taipei City (TW)

( * ) Notice: Subject to any disclaimer, the term of this patent is extended or adjusted under 35 U.S.C. 154(b) by 320 days.

(21) Appl. No.: 18/458,172

(22) Filed: Aug. 30, 2023

(65) Prior Publication Data

US 2025/0007216 A1 Jan. 2, 2025

(30) Foreign Application Priority Data

Jun. 29, 2023 (TW) ................................ 112124245

(51) Int. Cl.

| | |
|---|---|
| ***H01R 13/639*** | (2006.01) |
| ***H01R 13/443*** | (2006.01) |
| ***H01R 24/64*** | (2011.01) |

(52) U.S. Cl.

CPC ....... *H01R 13/6397* (2013.01); *H01R 13/443* (2013.01); *H01R 24/64* (2013.01)

(58) Field of Classification Search

CPC ... H01R 13/443; H01R 13/64; H01R 13/6397

See application file for complete search history.

(56) References Cited

U.S. PATENT DOCUMENTS

| | | | | |
|---|---|---|---|---|
| 7,993,063 | B2 * | 8/2011 | Hackett ................ | G02B 6/3849 385/92 |
| 8,672,694 | B2 | 3/2014 | Lee et al. | |
| 9,735,507 | B1 * | 8/2017 | Liang ................. | H01R 13/6397 |
| 2006/0040564 | A1 * | 2/2006 | Morrison ........... | H01R 13/5213 439/676 |
| 2010/0229363 | A1 | 9/2010 | Morrison et al. | |
| 2012/0282788 | A1 * | 11/2012 | Lin ........................ | H01R 43/26 439/135 |
| 2013/0102167 | A1 | 4/2013 | Litowitz et al. | |
| 2017/0214181 | A1 | 7/2017 | Tsay | |

* cited by examiner

*Primary Examiner* — Sean Gugger

(57) ABSTRACT

A protective component of a connector socket with a protective plug cap includes a main body of the protective plug cap has a slot and an opening, and there are a first elastic arm and a second elastic arm connected to the main body in the slot. An unlocking tool has an unlocking end that can enter the slot through the opening of the main body to apply an external force to make the first and second elastic arms respectively sway to blocking portions along different directions to move away relative to an inner wall of the connector socket. The unlocking tool is used to unlock the protective plug cap to remove from an electrical connection, so as to achieve the protection effect of preventing data theft.

4 Claims, 11 Drawing Sheets

PROTECTIVE COMPONENT OF CONNECTOR SOCKET AND PROTECTIVE PLUG CAP THEREOF

CROSS-REFERENCE TO RELATED APPLICATION

This non-provisional application claims priority under 35 U.S.C. § 119 (a) on Patent Application No(s). 112124245 filed in Taiwan, R.O.C. on Jun. 29, 2023, the entire contents of which are hereby incorporated by reference.

BACKGROUND OF THE INVENTION

1. Field of the Invention

The present disclosure relates to a connector, and in particular to a protective component of a connector socket for information transmission and a protective plug cap thereof.

2. Description of the Related Art

A traditional connector socket can be equipped with a protective plug cap, the protective plug cap is used to prevent unscrupulous people from arbitrarily plugging in transmission lines, thereby preventing data theft. When the user really wants to insert a plug of a transmission line into the socket, an unlocking tool can be used to remove the protective plug cap, and the transmission line can be properly connected to the connector socket.

However, when the traditional protective plug cap is installed in the connector socket, although there is a blocking structure to prevent it from disengaging the socket, this blocking structure usually only constitutes a single position of blocking in the socket. As a result, it is easy for unscrupulous people to use simple tools (such as a flathead screwdriver) to pry open the blocking structure and easily remove the protective plug cap, resulting in poor protection of the protective plug cap in preventing data theft.

Furthermore, the above unlocking tool includes an unlocking structure to unlock the blocking structure, and after unlocking it, a removing structure is used to remove the protective plug cap together. However, the structure and function of the unlocking structure and the removing structure are individually independent and fail to integrate. Accordingly, if a better protection effect of preventing data theft is to be achieved, the structure of the protective plug cap and the unlocking tool will be more complex and difficult to simplify.

Therefore, it is a focus of the present disclosure on how to solve the problems of the above conventional protective plug cap and unlocking tool.

BRIEF SUMMARY OF THE INVENTION

The present disclosure provides a protective plug cap for a connector socket, so as to assuredly achieve the protection effect for preventing data theft.

The present disclosure provides a protective plug cap for a connector socket, the connector socket has a socket port for connecting a plug, and the protective plug cap is suitable for installing in the socket port for locking and capable of being removed by an unlocking tool. The protective plug cap includes: a main body, the main body has a slot, and the main body has an opening communicating with the slot; a first elastic arm, which is connected to the main body by the slot, the first elastic arm has a first blocking portion for being blocked by an inner wall of the connector socket, the first elastic arm can be swayed to the first blocking portion along a first direction by an external force of the unlocking tool to move away relative to the inner wall; and a second elastic arm, which is connected to the main body by the slot, the second elastic arm has a second blocking portion for being blocked by the inner wall of the connector socket, the second elastic arm can be swayed to the second blocking portion along a second direction by the external force of the unlocking tool to move away relative to the inner wall, and the first direction and the second direction are not on the same axis.

The present disclosure provides a protective component for a connector socket, the connector socket has a socket port for connecting a plug, and the protective plug cap is suitable for installing in the socket port for locking. The protective component includes: a protective plug cap, the protective plug cap has a main body, the main body has a slot, and the main body has an opening communicating with the slot; a first elastic arm, which is connected to the main body by the slot, the first elastic arm has a first blocking portion for being blocked by an inner wall of the connector socket; a second elastic arm, which is connected to the main body by the slot, the second elastic arm has a second blocking portion for being blocked by the inner wall of the connector socket; and an unlocking tool, which has an unlocking end capable of entering the slot through the opening to apply an external force to make the first elastic arm sway to the first blocking portion along the first direction to move away relative to the inner wall, and apply an external force to make the second elastic arm sway to the second blocking portion along the second direction to move away relative to the inner wall, and the first direction and the second direction are not on the same axis.

In an embodiment, the unlocking tool has an unlocking end, the opening has an unlocking profile that is a male-female pairing with a section of the unlocking end, the unlocking tool is inserted into the slot by the unlocking end passing through the pairing opening, and the first elastic arm and the second elastic arm are applied by the external force with the unlocking end.

In an embodiment, the first elastic arm and the second elastic arm respectively have a latch portion, and the unlocking end has hooks that are provided to respectively correspond to the two latch portions. When the first elastic arm is subjected to the external force of the unlocking tool to sway along the first direction, and the second elastic arm is subjected to the external force of the unlocking tool to sway along the second direction, so that the first blocking portion and the second blocking portion are moved away relative to the inner wall, the unlocking end corresponding hooks the two latch portions with the two hooks in the slot, in order that the unlocking tool is capable of moving the main body out of the socket port.

In an embodiment, the first elastic arm has a first stem portion connected to the main body, and the first elastic arm has the first latch portion at an end, and vertically extends the first blocking portion, one side of the first blocking portion is facing the opening and is a plane, and the other side of the first blocking portion that is facing away from the opening is a curved surface. The second elastic arm has a second stem portion connected to the main body, and the second elastic arm is slightly curved, and has the second latch portion at an end.

In an embodiment, the unlocking end has a first locking part and a second locking part. Sections of the first locking part and the second locking part are used to form the unlocking profile. The first locking part is provided to correspond to the first elastic arm, and has the first hook at an end, and the second locking part is provided to correspond to the second elastic arm, and has the second hook at an end. The first locking part is used to apply an external force to make the first elastic arm sway to the first blocking portion along the first direction to move away relative to the inner wall, and the first hook is used to hook the first latch portion in the first direction. The second locking part is used to apply an external force to make the second elastic arm sway to the second blocking portion along the second direction to move away relative to the inner wall, and the second hook is used to hook the second latch portion in the second direction, so that when the unlocking tool is relatively withdrawn from the connector socket, the main body can be removed together.

Accordingly, if the protective plug cap provided by the present disclosure is to be unlocked, it is required to simultaneously apply force on the first elastic arm to sway along the first direction and the second elastic arm to sway along the second direction, so that the first blocking portion and the second blocking portion are removed from the inner wall of the connector socket, in order to remove the protective plug cap from the connector socket, thereby increasing the difficulty of unlocking the protective plug cap, and thus achieving a good protection effect to prevent information theft.

Furthermore, the protective component provided by the present disclosure includes the unlocking tool, which has the unlocking end used to unlock the protective plug cap. The section of the unlocking end must have a profile pairing with the opening of the protective plug cap. The unlocking end can pass through the opening, and while the unlocking end applies force on the first elastic arm and the second elastic arm to unlock, the hooks provided are used to correspondingly hook the two latch portions of the first elastic arm and the second elastic arm, the protective plug cap can be removed from the connector socket, thereby integrating the unlocking structure and removing structure of the protective plug cap at the unlocking end, in order to achieve both the effects of strengthening anti-theft and having a simplified structure.

DETAILED DESCRIPTION OF THE INVENTION

In order to fully understand the objectives, characteristics, and effects of the present disclosure, by means of the following specific embodiments, together with the attached drawings, the present disclosure is described below in detail.

Figure 1:
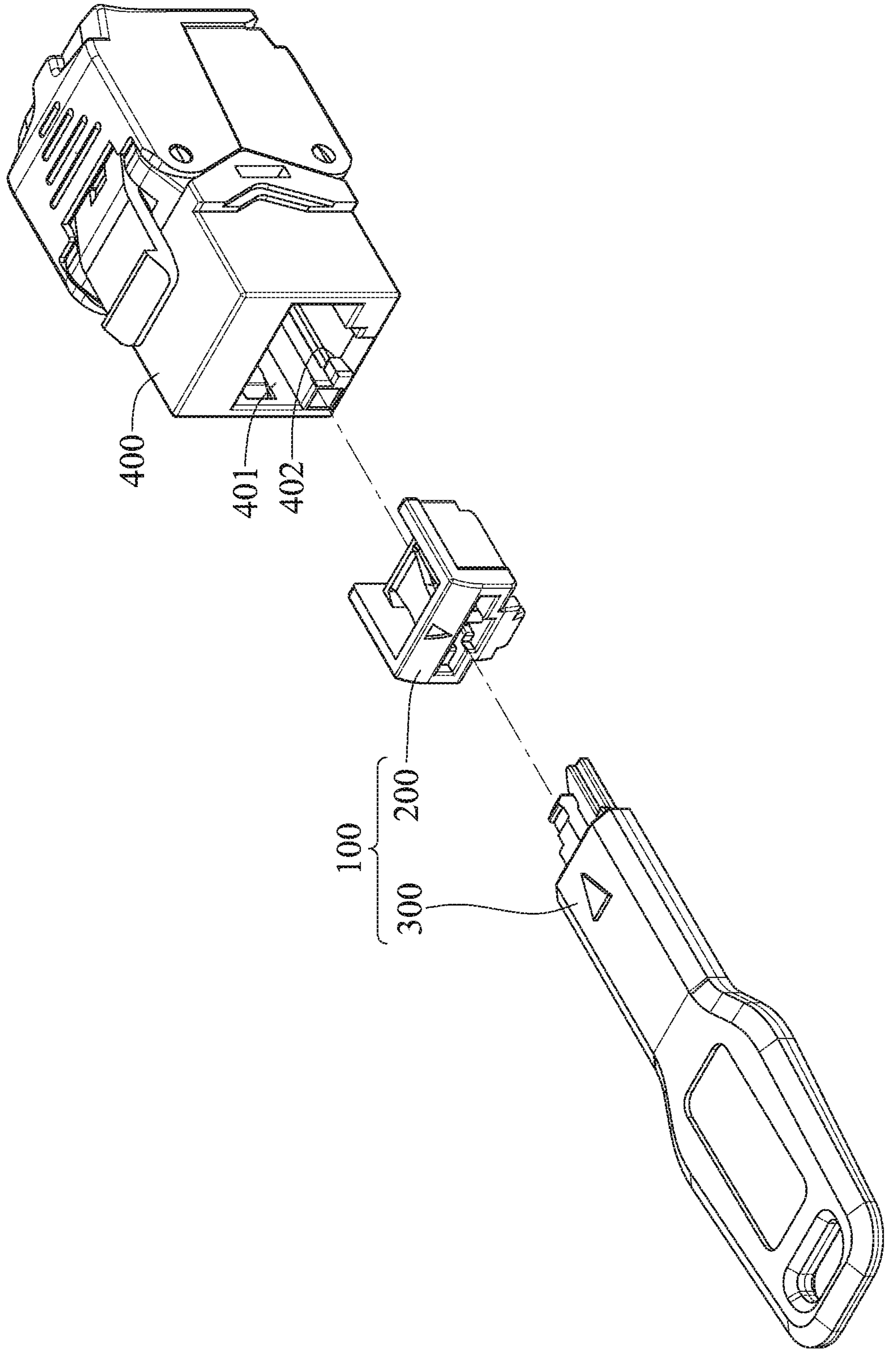
FIG. 1 is a schematic diagram illustrating an assembly of a protective component and a connector socket according to an embodiment of the present disclosure.

Referring to FIGS. 1 to 13H, the present disclosure provides a protective component 100 of a connector socket, the connector socket is mainly used for a connection when transmitting information (e.g., a plug connecting an information transmission line). As shown in FIG. 1, the protective component 100 includes a protective plug cap 200 and an unlocking tool 300. The protective plug cap 200 may be installed in a socket port 401 of the connector socket 400. The protective plug cap 200 can be only unlocked through the unlocking tool 300 so that the protective plug cap 200 can be removed from the connector socket 400. The specific embodiments of the above protective component 100 are described below.

Figure 4:
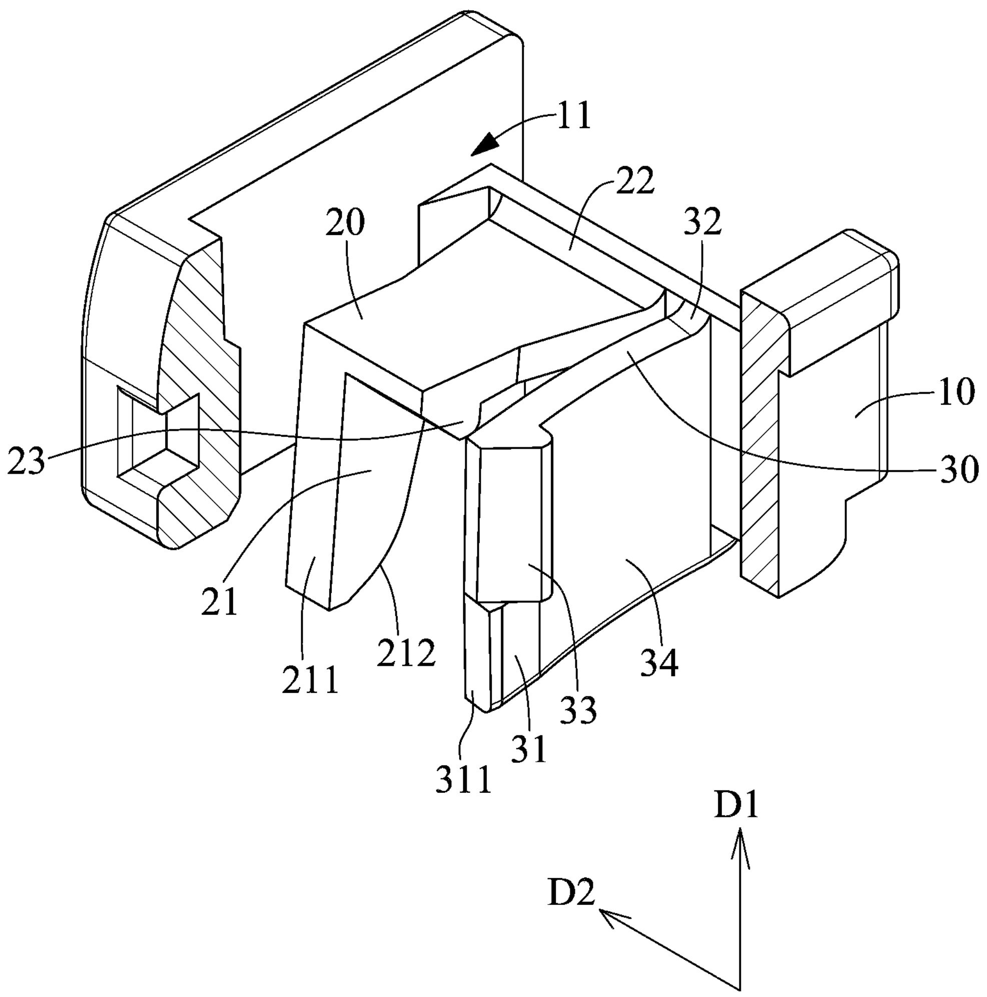
FIG. 4 is a structure diagram of the protective plug cap and a first elastic arm and a second elastic arm in a slot thereof according to an embodiment of the present disclosure.

As shown in FIG. 4, the protective plug cap 200 includes a main body 10, a first elastic arm 20, and a second elastic arm 30. The main body 10 has a slot 11, and the main body 10 has an opening 12 communicating with the slot 11. The first elastic arm 20 is connected to the main body 10 by the slot 11, and the first elastic arm 20 has a first blocking portion 21 (as shown in FIG. 4). The second elastic arm 30 is similarly connected to the main body 10 by the slot 11, and the second elastic arm 30 has a second blocking portion 31 (as shown in FIG. 4). When the protective plug cap 200 is installed in the socket port 401, the first elastic arm 20 will be blocked in the connector socket 400 by an inner wall 402 thereof with the first blocking portion 21 (as shown in FIGS. 5 and 6) and the second elastic arm 30 will also be blocked in the connector socket 400 by the inner wall 402 thereof with the second blocking portion 31 (as shown in FIGS. 5 and 7) so that the protective plug cap 200 forms a locking effect in the connector socket 400.

Figure 5:
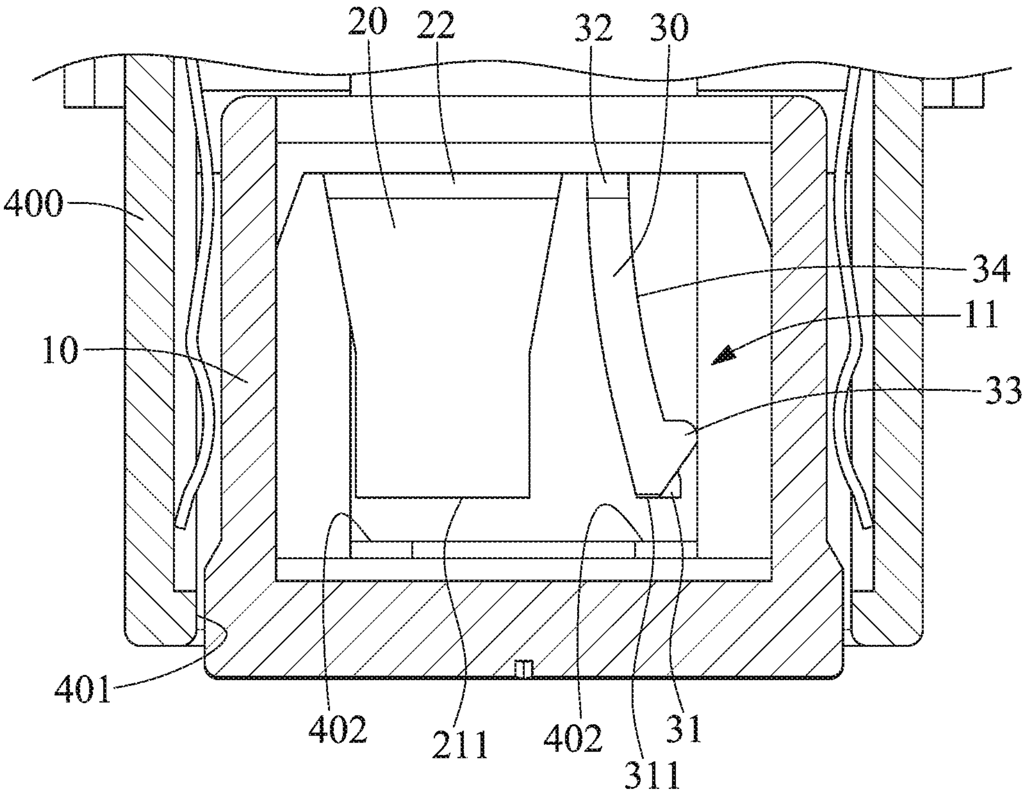
FIG. 5 is an internal structure diagram shown from a viewing angle of the 5-5 section line of FIG. 2.
Figure 6:
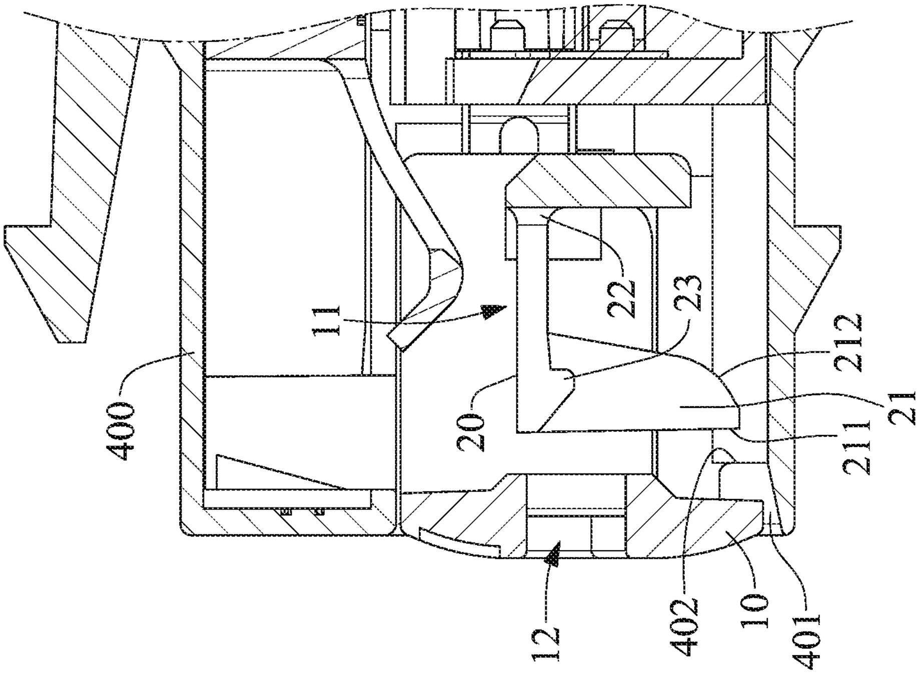
FIG. 6 is an internal structure diagram shown from a viewing angle of the 6-6 section line of FIG. 2.
Figure 8:
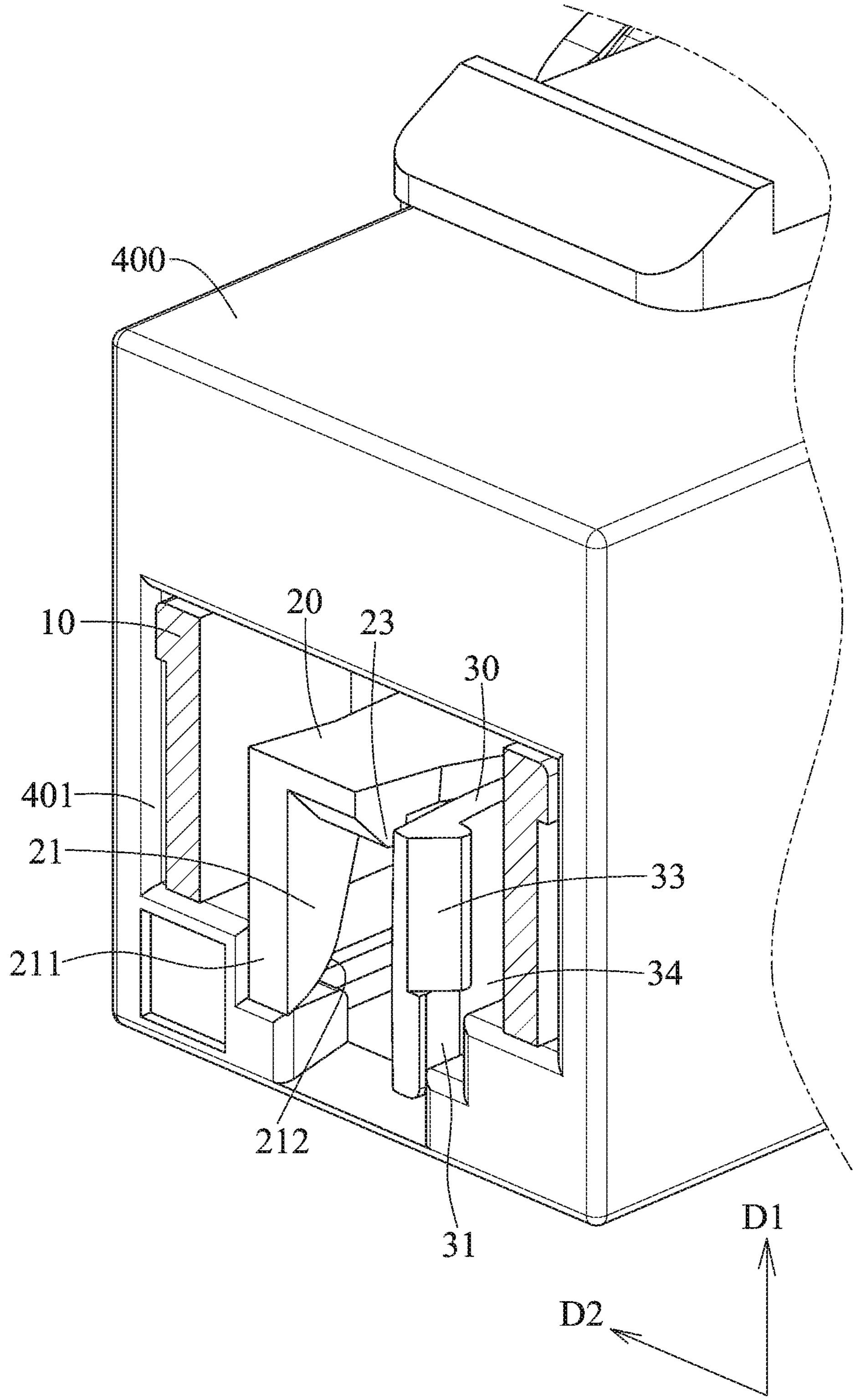
FIG. 8 is a schematic diagram illustrating the protective plug cap installed in the connector socket according to an embodiment of the present disclosure.

As shown in FIGS. 4 to 6, the first elastic arm 20 has a first stem portion 22 connected to the main body 10, and has a first latch portion 23 at an end, and vertically extends the first blocking portion 21 at the end. One side of the first blocking portion 21 is facing the opening 12 and is a plane 211, and the other side of the first blocking portion 21 is facing away from the opening 12 and is a curved surface 212. As shown in FIG. 8, in the process of installing the main body 10 in the connector socket 400 and entering the socket port 401, the first elastic arm 20 uses the curved surface 212 to move in contact with the connector socket 400, and the first elastic arm 20 follows the curved surface 212 to be lifted along a first direction D1. When the first blocking portion 21 follows the curved surface 212 and crosses the opening 12, it returns to its original position. At this time the first blocking portion 21 uses the plane 211 to face the inner wall 402 to form a barrier (referring to FIGS. 5 and 6 together).

Figure 7:
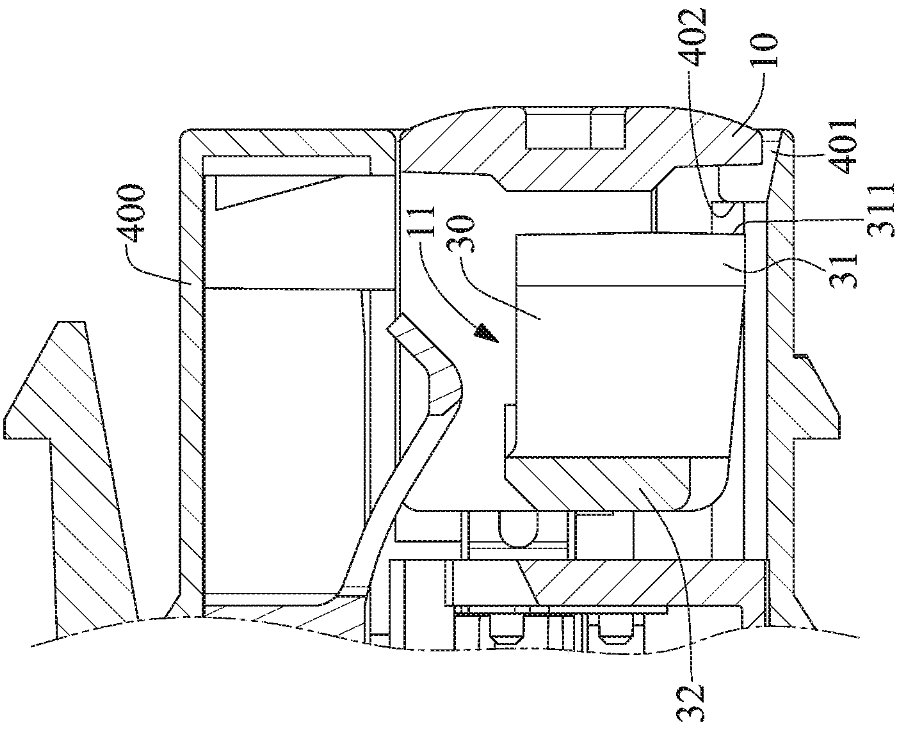
FIG. 7 is an internal structure diagram shown from a viewing angle of the 7-7 section line of FIG. 2.

As shown in FIGS. 4, 5, and 7, the second elastic arm 30 has a second stem portion 32 connected to the main body 10, and the second elastic arm 30 is slightly curved and has a second latch portion 33 at an end. As shown in FIG. 8, in the process of installing the main body 10 in the connector socket 400 and entering the socket port 401, the second elastic arm 30 uses a curved side 34 thereof to contact the connector socket 400, and the second elastic arm 30 sways sideways along a second direction D2 by movement. When the second blocking portion 31 crosses the opening 12, it returns to its original position. At this time the second blocking portion 31 uses an end face 311 to face the inner wall 402 to form a barrier (referring to FIG. 7 together).

Figure 2:
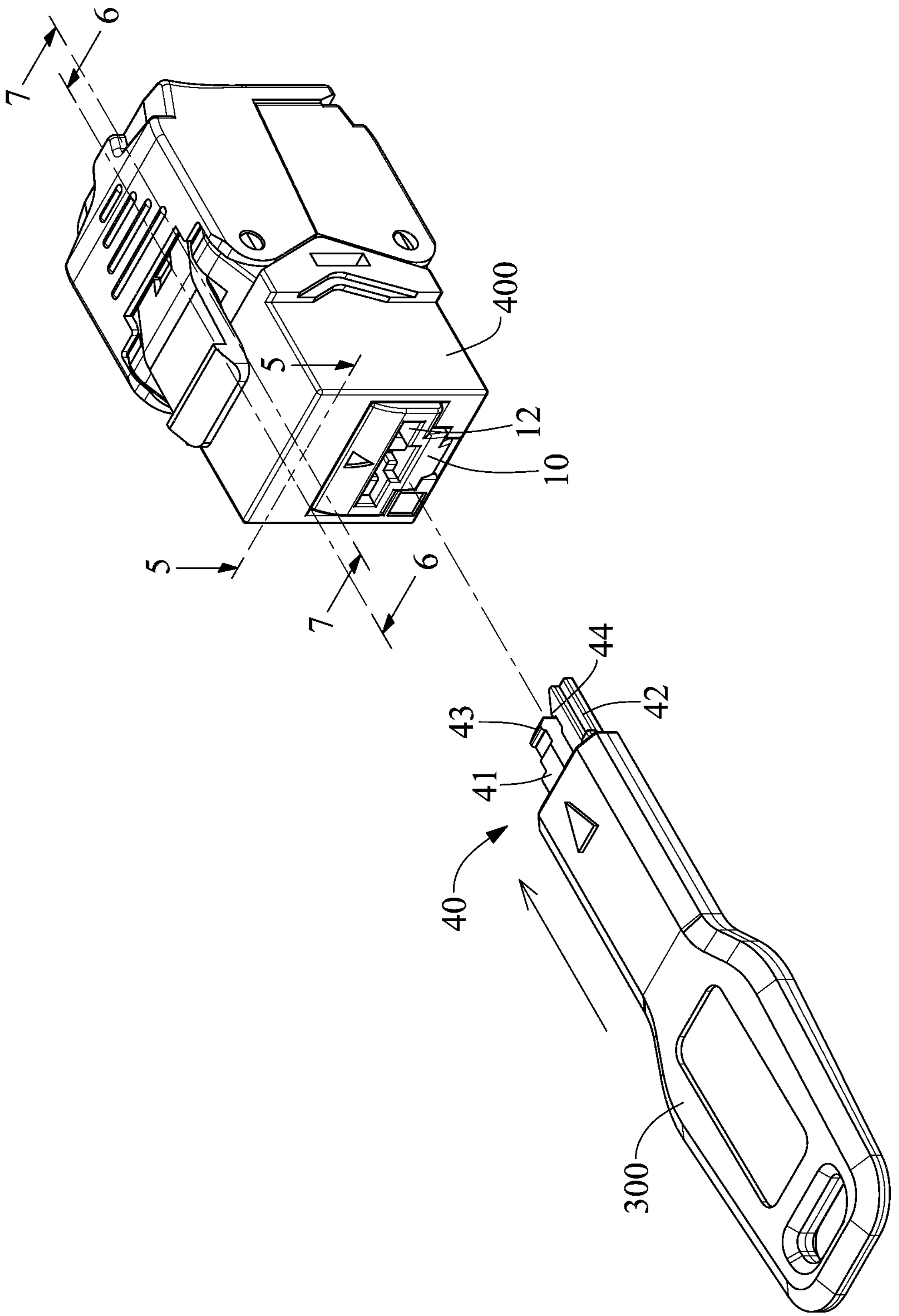
FIG. 2 is a schematic diagram illustrating an unlocking tool butting with a protective plug cap for unlocking according to an embodiment of the present disclosure.
Figure 3:
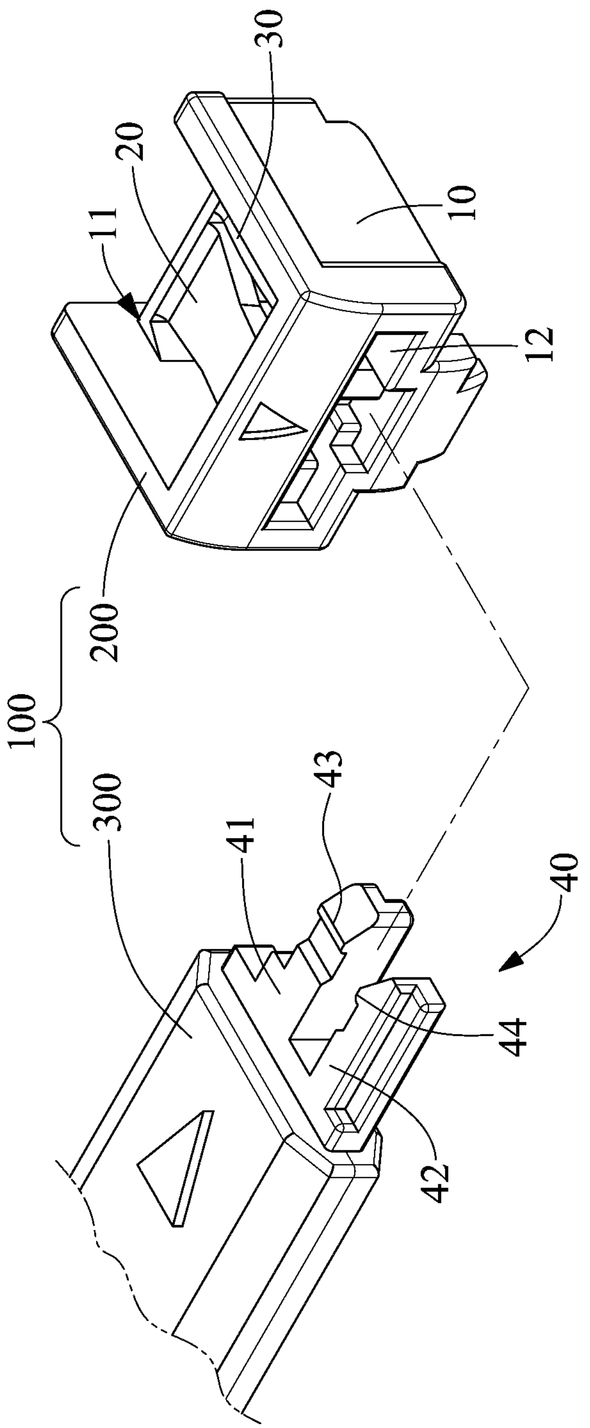
FIG. 3 is a configuration diagram illustrating an unlocking end of the unlocking tool and the protective plug cap according to an embodiment of the present disclosure.
Figure 9:
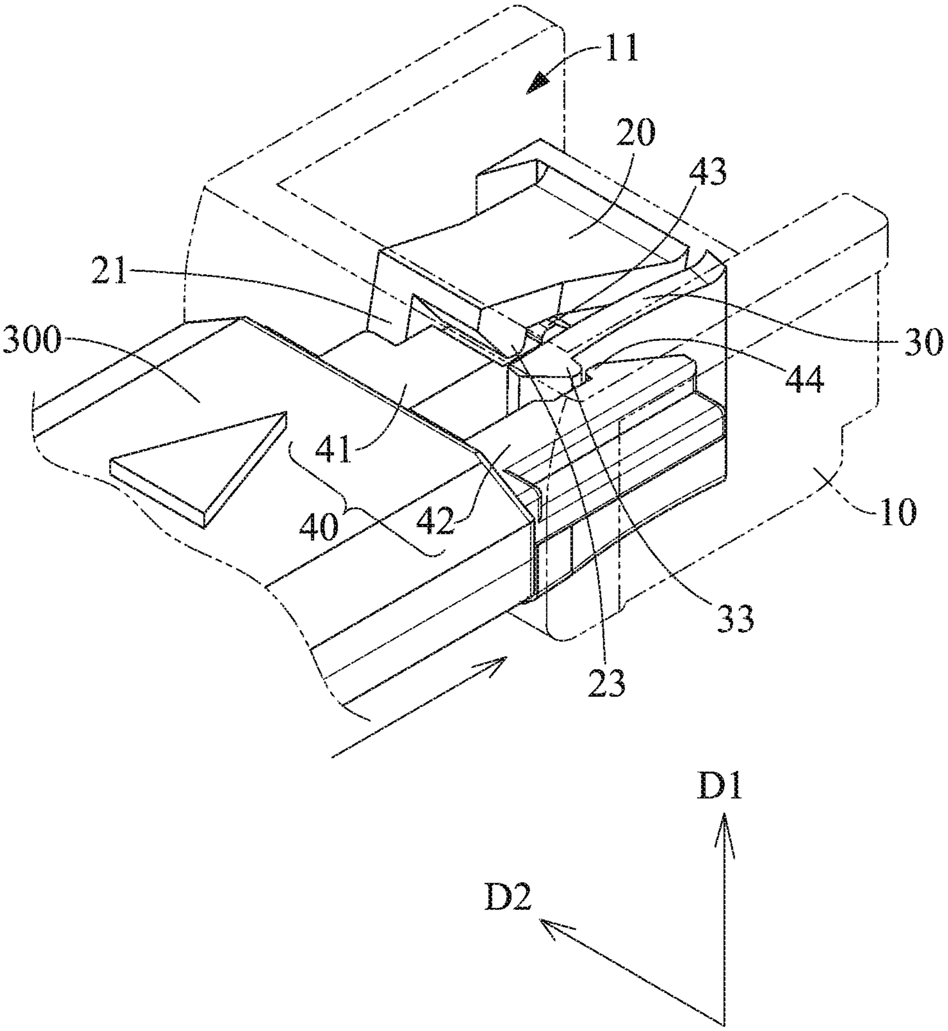
FIG. 9 is a schematic diagram illustrating an unlocking state of the unlocking end of the unlocking tool inserted into in the slot of the protective plug cap according to an embodiment of the present disclosure.
Figure 11:
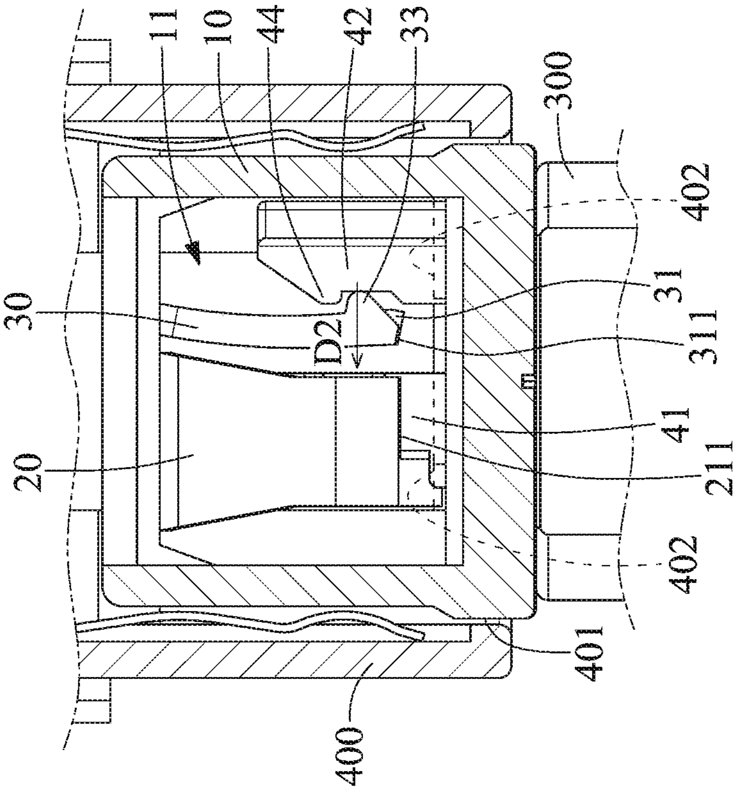
FIG. 11 is a schematic diagram of the unlocking tool and the protective plug cap in the unlocked state of FIG. 9 according to the viewing angle of FIG. 5.
Figure 10:
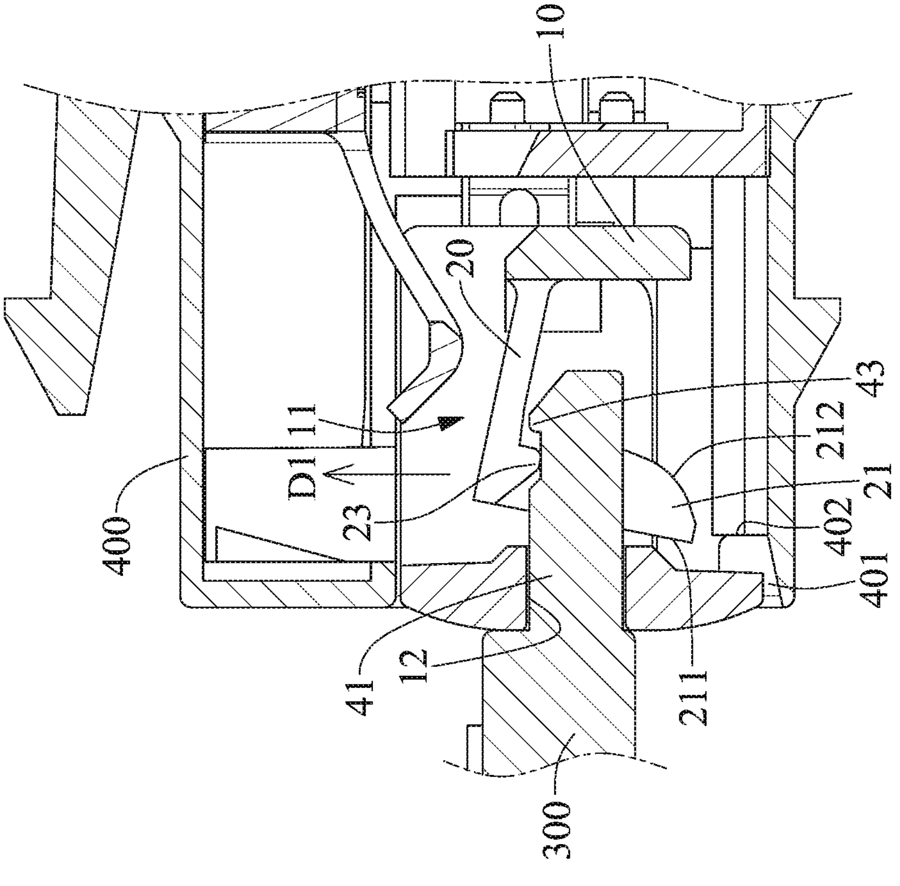
FIG. 10 is a schematic diagram of the unlocking tool and the protective plug cap in the unlocked state of FIG. 9 according to the viewing angle of FIG. 6.

As shown in FIGS. 2 and 3, the unlocking tool 300 has an unlocking end 40 capable of entering the slot 11 through the opening 12 (referring to FIG. 9 together) to apply an external force to make the first elastic arm 20 sway to the first blocking portion 21 along the first direction D1 (as shown in FIGS. 9 and 10) to move away relative to the inner wall 402 and apply an external force to make the second elastic arm 30 sway to the second blocking portion 31 along the second direction D2 (as shown in FIGS. 9 and 11) to move away relative to the inner wall 402. The first direction D1 and the second direction D2 are different directions.

In an embodiment, the first direction D1 corresponds to the first elastic arm 20 swinging up and down and is longitudinal and the second direction D2 corresponds to the left and right swing of the second elastic arm 30 and is transverse. At the time the first direction D1 and the second direction D2 intersect perpendicularly at an angle of 90 degrees, but the present disclosure is not limited thereto, the angle difference between the first direction D1 and the second direction D2 may also be less than 90 degrees but greater than 0 degrees (i.e., the first direction D1 and the second direction D2 will not be the same), or the angle difference between the first direction D1 and the second direction D2 may be greater than 90 degrees but less than 180 degrees (i.e., the first direction D1 and the second direction D2 are not opposite to each other). Therefore, the first direction D1 and the second direction D2 are not on the same axis to ensure that the first elastic arm 20 and the second elastic arm 30 will not be pulled by the same tool in the same direction or opposite direction at the same time to improve the difficulty of unlocking.

As shown in FIG. 3, the unlocking end 40 has a first locking part 41 and a second locking part 42, wherein the first locking part 41 is provided to correspond to the first elastic arm 20, and an end of the first locking part 41 has a first hook 43, and the first hook 43 is provided to correspond to the first latch portion 23 (referring to FIG. 9 together). The second locking part 42 is provided to correspond to the second elastic arm 30, and an end of the second locking part 42 has a second hook 44, and the second hook 44 is provided to correspond to the second latch portion 33 (referring to FIG. 9 together).

Figure 12:
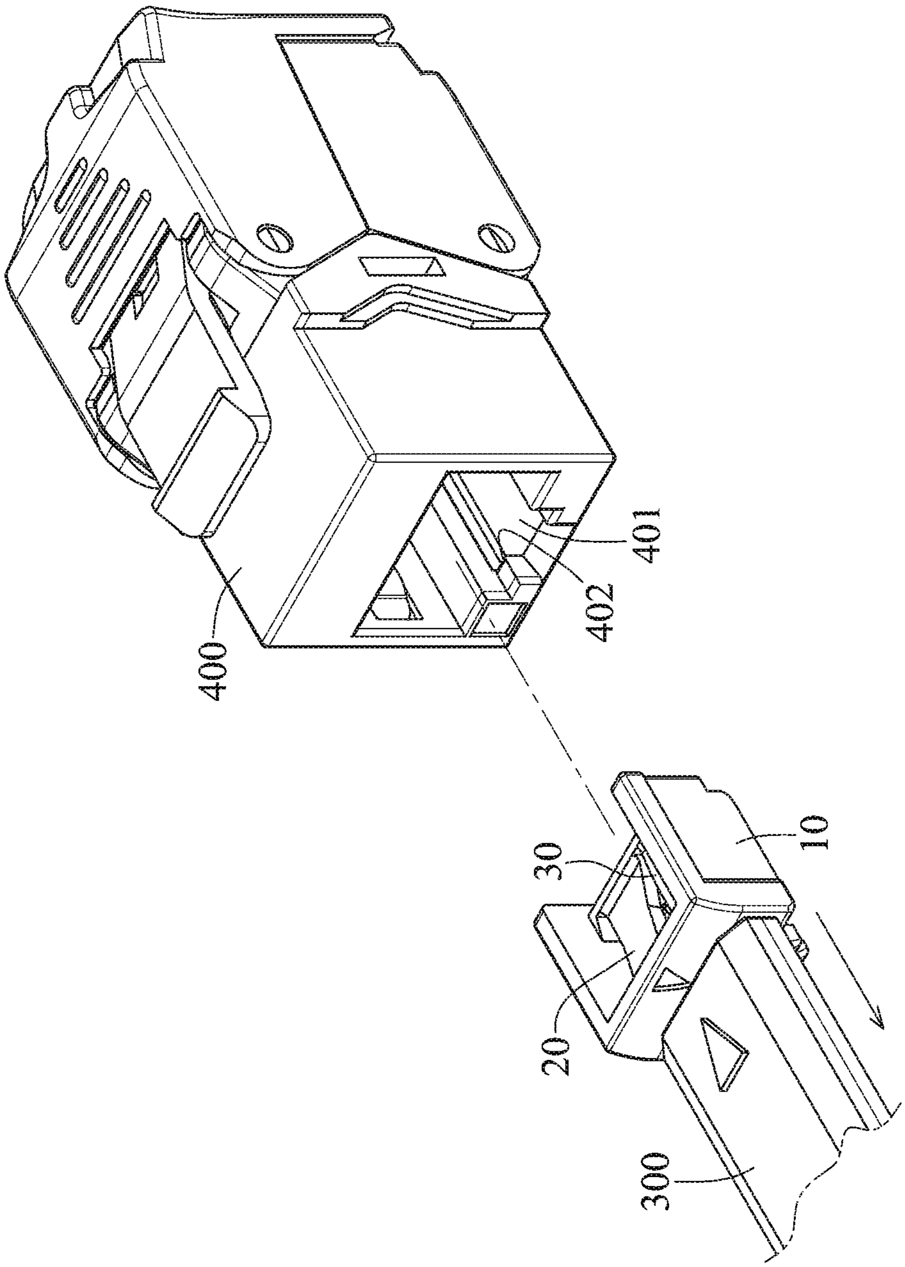
FIG. 12 is a schematic diagram illustrating the unlocking tool removing the protective plug cap from the connector socket according to an embodiment of the present disclosure.

In actual operation, when the unlocking tool 300 is handheld in order to insert the unlocking end 40 from the opening 12 to the slot 11 (as shown in FIG. 9), the first locking part 41 is used to apply an external force to make the first elastic arm 20 sway to the first blocking portion 21 along the first direction D1 to move away relative to the inner wall 402, and the first hook 43 is used to hook the first latch portion 23 in the first direction D1 (as shown in FIG. 10). The second locking part 42 is used to apply an external force to make the second elastic arm 30 sway to the second blocking portion 31 along the second direction D2 to move away relative to the inner wall 402, and the second hook 44 is used to hook the second latch portion 33 in the second direction D2 (as shown in FIG. 11). In this way when the unlocking tool 300 is relatively withdrawn from the connector socket 400, the main body 10 can be removed from the socket port 401 together (as shown in FIG. 12).

Figure 13A:
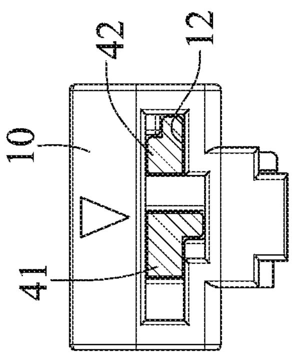
FIG. 13A is a schematic diagram of an unlocking profile of the unlocking end and the opening of the protective plug cap according to an embodiment of the present disclosure.
Figure 13B:
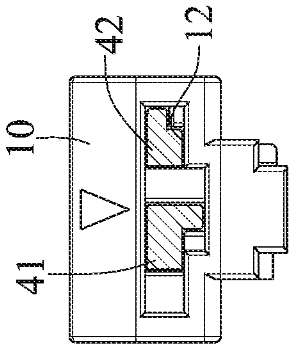
FIG. 13B is a schematic diagram of an unlocking profile of the unlocking end and the opening of the protective plug cap according to an embodiment of the present disclosure.
Figure 13C:
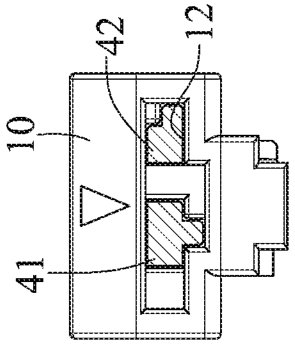
FIG. 13C is a schematic diagram of an unlocking profile of the unlocking end and the opening of the protective plug cap according to an embodiment of the present disclosure.
Figure 13D:
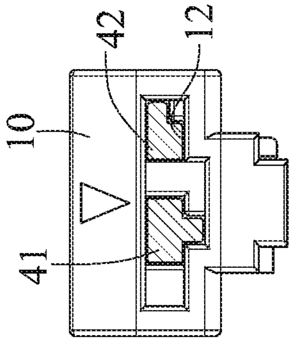
FIG. 13D is a schematic diagram of an unlocking profile of the unlocking end and the opening of the protective plug cap according to an embodiment of the present disclosure.
Figure 13E:
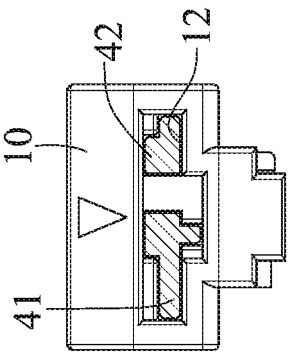
FIG. 13E is a schematic diagram of an unlocking profile of the unlocking end and the opening of the protective plug cap according to an embodiment of the present disclosure.
Figure 13F:
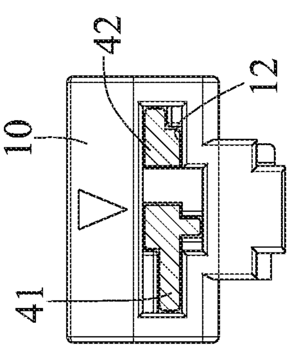
FIG. 13F is a schematic diagram of an unlocking profile of the unlocking end and the opening of the protective plug cap according to an embodiment of the present disclosure.
Figure 13G:
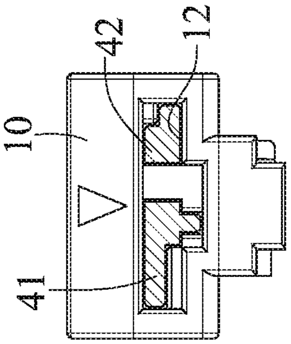
FIG. 13G is a schematic diagram of an unlocking profile of the unlocking end and the opening of the protective plug cap according to an embodiment of the present disclosure.
Figure 13H:
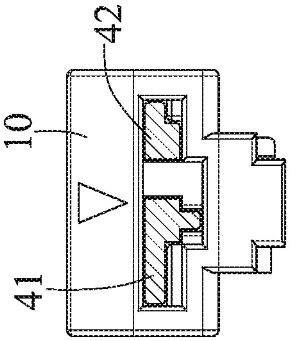
FIG. 13H is a schematic diagram of an unlocking profile of the unlocking end and the opening of the protective plug cap according to an embodiment of the present disclosure.

The unlocking tool 300 has the unlocking end 40, wherein sections of the first locking part 41 and the second locking part 42 of the unlocking end 40 and the opening 12 may have an unlocking profile that is a male-female pairing. As shown in FIG. 13A, it shows the sections of the first locking part 41 and the second locking part 42 of the above embodiment and the opening 12 to form an unlocking profile with a male-female pairing. The unlocking profile of the male-female pairing may have many kinds of variations. For example, the unlocking profiles shown in FIGS. 13A to 13H are different, only in the case of the unlocking profiles coinciding with each other, the first locking part 41 and the second locking part 42 of the unlocking end 40 can unlock the protective plug cap 200 through the opening 12.

From the above description, it is not difficult to find that the present disclosure has numerous technical features.

Because the protective plug cap 200 of the present disclosure is provided with a first elastic arm 20 and a second elastic arm 30 in the slot 11, and the first direction D1 that the first elastic arm 20 swings and the second direction D2 that the second elastic arm 30 swings are different directions, if unscrupulous people hold the unlocking tool 300 and want to unlock the protective plug cap 200, the unscrupulous people must hold the tool correctly and try to apply force on the first elastic arm 20 swing along the first direction D1, and apply force on the second elastic arm 30 swinging along the second direction D2 at the same time, in order to remove the first blocking portion 21 and the second blocking portion 31 away from the inner wall 402 of the connector socket 400, so that at least two actions are required to remove the protective plug cap 200 from the connector socket 400. Compared to the traditional protective plug cap, it can be seen that the difficulty of unlocking the protective plug cap 200 of the present disclosure will be relatively increased, so as to play a role in making the unscrupulous people retreat in the face of difficulties, and thereby achieving a superior protection effect to prevent data theft.

Furthermore, the protective component 100 provided by the present disclosure includes the unlocking tool 300, which has the unlocking end 40 used to unlock the protective plug cap 200, since the sections of the first locking part 41 and the second locking part 42 of the unlocking end 40 and the opening 12 of the main body 10 have an unlocking profile that is a male-female pairing, the first locking part 41 and the second locking part 42 of the unlocking end 40 can pass through the opening 12, and while the first locking part 41 and the second locking part 42 respectively apply force on the first elastic arm 20 and the second elastic arm 30 for unlocking, the first hook 43 is used to correspondingly hook the first latch portion 23, and the second hook 44 is used to correspondingly hook the second latch portion 33. As a result, the protective plug cap 200 can be removed from the connector socket 400. It can be seen that the first locking part 41 and the second locking part 42 respectively integrate structures of unlocking and removing the protective plug cap 200 together, in order to achieve the effects of anti-theft and having a simplified structure, with unlocking restrictions of the first elastic arm 20 and the second elastic arm 30 that must be unlocked at the same time, it can simultaneously improve the protective effect of preventing data theft.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A protective plug cap of a connector socket, the connector socket has a socket port for connecting a plug, the protective plug cap is suitable for installing in the socket port for locking and capable of being removed by an unlocking tool, the protective plug cap comprising:

a main body, the main body has a slot, and the main body has an opening communicating with the slot;

a first elastic arm, connected to the main body by the slot, the first elastic arm has a first blocking portion for being blocked by an inner wall of the connector socket, and the first elastic arm can be swayed to the first blocking portion along a first direction by an external force of the unlocking tool to move away relative to the inner wall; and a second elastic arm, connected to the main body in the slot, the second elastic arm has a second blocking portion for being blocked by the inner wall of the connector socket, and the second elastic arm can be swayed to the second blocking portion along a second direction by the external force of the unlocking tool to move away relative to the inner wall, and the first direction and the second direction are not on the same axis, wherein the unlocking tool has an unlocking end, the opening has an unlocking profile that is a male-female pairing with a section of the unlocking end, and the unlocking tool is inserted into the slot by the unlocking end passing through the pairing opening, and the first elastic arm and the second elastic arm are applied by the external force with the unlocking end, wherein the first elastic arm and the second elastic arm respectively have a first latch portion and a second latch portion, and the unlocking end has a first hook and a second hook that are provided to respectively correspond to the first latch portion and the second latch portion, when the first elastic arm is subjected to the external force of the unlocking tool to sway along the first direction, and the second elastic arm is subjected to the external force of the unlocking tool to sway along the second direction, so that the first blocking portion and the second blocking portion are moved away relative to the inner wall, and the unlocking end correspondingly hooks the first latch portion and the second latch portion with the first hook and the second hook in the slot, and the unlocking tool is capable of moving the main body out of the socket port, and wherein the first elastic arm has a first stem portion connected to the main body, and the first elastic arm has the first latch portion at an end, and vertically extends the first blocking portion, one side of the first blocking portion is facing the opening and is a plane, and the other side of the first blocking portion that is facing away from the opening is a curved surface, and the second elastic arm has a second stem portion connected to the main body, and the second elastic arm is curved, and has the second latch portion at an end.

2. The protective plug cap of the connector socket according to claim 1, wherein the unlocking end has a first locking part and a second locking part, and sections of the first locking part and the second locking part are used to form the unlocking profile, wherein the first locking part is provided to correspond to the first elastic arm, and has a first hook at an end, and the second locking part is provided to correspond to the second elastic arm, and has a second hook at an end, the first locking part is used to apply an external force to make the first elastic arm sway to the first blocking portion along the first direction to move away relative to the inner wall, and the first hook is used to hook the first latch portion in the first direction; and the second locking part is used to apply an external force to make the second elastic arm sway to the second blocking portion along the second direction to move away relative to the inner wall, and the second hook is used to hook the second latch portion in the second direction, so that when the unlocking tool is relatively withdrawn from the connector socket, the main body can be removed together.

3. A protective component of a connector socket, the connector socket has a socket port for connecting a plug, the protective component is suitable for installing in the socket port for locking, the protective component comprising:

a protective plug cap, the protective plug cap has a main body, the main body has a slot, and the main body has an opening communicating with the slot;

a first elastic arm, connected to the main body by the slot, the first elastic arm has a first blocking portion for being blocked by an inner wall of the connector socket;

a second elastic arm, connected to the main body by the slot, the second elastic arm has a second blocking portion for being blocked by the inner wall of the connector socket; and an unlocking tool, having an unlocking end capable of entering the slot through the opening to apply an external force to make the first elastic arm sway to the first blocking portion along a first direction to move away relative to the inner wall, and apply an external force to make the second elastic arm sway to the second blocking portion along a second direction to move away relative to the inner wall, and the first direction and the second direction are not on the same axis, wherein the opening and a section of the unlocking end have an unlocking profile that is a male-female pairing, the unlocking tool is inserted into the slot by the unlocking end passing through the opening, in order to apply the external force to the first elastic arm and the second elastic arm, wherein the first elastic arm and the second elastic arm respectively have a first latch portion and a second latch portion, and the unlocking end has a first hook and a second hook that are provided to respectively correspond to the first latch portion and the second latch portion, when the first elastic arm is subjected to the external force of the unlocking tool to sway along the first direction, and the second elastic arm is subjected to the external force of the unlocking tool to sway along the second direction, so that the first blocking portion and the second blocking portion are moved away relative to the inner wall, the unlocking end with the first hook and the second hook hooks the first latch portion and the second latch portion in the slot, in order that the unlocking tool is capable of moving the main body out of the socket port, and wherein the first elastic arm has a first stem portion connected to the main body, the first elastic arm has the first latch portion at an end, and vertically extends the first blocking portion, one side of the first blocking portion is facing the opening and is a plane, and the other side of the first blocking portion that is facing away from the opening is a curved surface, and the second elastic arm has a second stem portion connected to the main body, and the second elastic arm is curved, and has the second latch portion at an end.

4. The protective component of the connector socket according to claim 3, wherein the unlocking end has a first locking part and a second locking part, sections of the first locking part and the second locking part are used to form the unlocking profile, wherein the first locking part is provided to correspond to the first elastic arm, and has the first hook at an end, and the second locking part is provided to correspond to the second elastic arm, and has the second hook at an end, the first locking part is used to apply an external force to make the first elastic arm sway to the first blocking portion along the first direction to move away relative to the inner wall, and the first hook is used to hook the first latch portion in the first direction; the second locking part is used to apply an external force to make the second elastic arm sway to the second blocking portion along the second direction to move away relative to the inner wall, and the second hook is used to hook the second latch portion in the second direction, so that when the unlocking tool is relatively withdrawn from the connector socket, the main body can be removed together.

* * * * *